United States Patent
Falcone et al.

(10) Patent No.: US 12,221,105 B2
(45) Date of Patent: Feb. 11, 2025

(54) SYSTEM AND METHOD OF CONTROLLING TORQUE PROVIDED WITH AN AXLE ASSEMBLY

(71) Applicant: ArvinMeritor Technology, LLC, Troy, MI (US)

(72) Inventors: Frank J. Falcone, Escondido, CA (US); Ameya S. Jathar, Escondido, CA (US)

(73) Assignee: ArvinMeritor Technology, LLC, Troy, MI (US)

( * ) Notice: Subject to any disclaimer, the term of this patent is extended or adjusted under 35 U.S.C. 154(b) by 236 days.

(21) Appl. No.: 17/892,290

(22) Filed: Aug. 22, 2022

(65) Prior Publication Data

US 2024/0059290 A1    Feb. 22, 2024

(51) Int. Cl.
*B60W 30/18* (2012.01)
*B60W 10/08* (2006.01)
*B60W 10/184* (2012.01)

(52) U.S. Cl.
CPC ...... *B60W 30/18027* (2013.01); *B60W 10/08* (2013.01); *B60W 10/184* (2013.01); *B60W 2520/00* (2013.01); *B60W 2540/00* (2013.01)

(58) Field of Classification Search
CPC ........... B60W 30/18027; B60W 10/08; B60W 10/184; B60W 2520/00; B60W 2540/00; B60W 30/18118; B60L 2240/423; B60L 15/2063; B60L 15/2072; B60L 15/2018
See application file for complete search history.

(56) References Cited

U.S. PATENT DOCUMENTS

| | | | |
|---|---|---|---|
| 9,511,777 B2 * | 12/2016 | Blyth | B60W 40/105 |
| 10,112,613 B2 * | 10/2018 | Hunt | B60W 20/00 |
| 10,821,948 B2 | 11/2020 | Fridman et al. | |
| 10,989,288 B1 | 4/2021 | Ghatti et al. | |
| 11,002,352 B2 | 5/2021 | Ghatti et al. | |
| 11,038,396 B2 | 6/2021 | Raya et al. | |
| 11,207,976 B2 | 12/2021 | Ghatti et al. | |
| 11,209,072 B2 | 12/2021 | Ghatti et al. | |
| 11,220,176 B1 | 1/2022 | Cradit et al. | |
| 2013/0030674 A1 * | 1/2013 | Minase | F02D 41/021 701/110 |
| 2013/0123066 A1 * | 5/2013 | Tomiie | B60K 28/10 477/185 |
| 2013/0197731 A1 * | 8/2013 | Schum | B60L 15/2063 701/22 |
| 2015/0100222 A1 | 4/2015 | Beger et al. | |
| 2018/0345973 A1 * | 12/2018 | Krueger | B60T 13/588 |
| 2021/0101574 A1 * | 4/2021 | Bakewell | B60T 8/245 |

(Continued)

OTHER PUBLICATIONS

Extended European Search Report dated Dec. 4, 2023 for related European Appln. No. 23192176.8 9 Pages.

(Continued)

*Primary Examiner* — Hunter B Lonsberry
*Assistant Examiner* — Henry R Hinton
(74) *Attorney, Agent, or Firm* — Brooks Kushman PC

(57) ABSTRACT

A system and method of controlling a vehicle that has an axle assembly and a wheel. Propulsion torque and friction brake torque are simultaneously provided to the wheel with an electric motor and a friction brake, respectively, when braking and acceleration of the vehicle are both requested for a predetermined period of time.

20 Claims, 2 Drawing Sheets

(56) References Cited

U.S. PATENT DOCUMENTS

| | | |
|---|---|---|
| 2021/0291646 A1 | 9/2021 | Lorenz et al. |
| 2022/0185245 A1* | 6/2022 | Gabara .................. B60T 7/122 |
| 2022/0266833 A1* | 8/2022 | Cho ................ B60W 30/18027 |

OTHER PUBLICATIONS

Cradit et al, U.S. Appl. No. 17/308,307, filed May 5, 2021, 46 pages.
Godo et al, U.S. Appl. No. 17/591,177, filed Feb. 2, 2022, 35 pages.

* cited by examiner

SYSTEM AND METHOD OF CONTROLLING TORQUE PROVIDED WITH AN AXLE ASSEMBLY

TECHNICAL FIELD

This relates to a system and method of controlling torque that is provided with an axle assembly of a vehicle, the axle assembly having an electric motor.

BACKGROUND

An automated holding method for a vehicle on a slope is disclosed in U.S. Patent Publication No. 2015/0100222.

SUMMARY

A method of controlling a vehicle is provided. The method includes simultaneously providing propulsion torque and friction brake torque to a wheel that is disposed on an axle assembly when braking and acceleration of the vehicle are both requested for a predetermined period of time. Propulsion torque is provided with an electric motor. Friction brake torque is provided with a friction brake.

The method may include determining whether the vehicle is stationary before simultaneously providing propulsion torque and friction brake torque to the wheel. Propulsion torque and friction brake torque may be simultaneously provided to the wheel when the vehicle is stationary.

Simultaneously providing propulsion torque and friction brake torque may include temporarily permitting the propulsion torque to exceed the friction brake torque. Simultaneously providing propulsion torque and friction brake torque may include providing propulsion torque that exceeds the friction brake torque.

The method may include determining whether the vehicle launches after temporarily permitting propulsion torque to exceed the friction brake torque. The vehicle may be launched when a vehicle speed is greater than zero. The method may include not permitting propulsion torque to exceed the friction brake torque once the vehicle launches.

The method may include measuring the predetermined period of time with a timer and resetting the timer when the vehicle does not launch. The timer may start when braking and acceleration of the vehicle are both requested. The method may include resetting the timer when braking is not requested. The method may include resetting the timer when acceleration is not requested. The method may include resetting the timer when braking and acceleration are not requested. Braking of the vehicle may be based on a signal from a brake pedal. Acceleration of the vehicle may be based on a signal from an accelerator pedal.

A vehicle is provided that includes an axle assembly and a control system. The axle assembly includes an electric motor and a friction brake. The electric motor is configured to provide propulsion torque to a wheel that is mounted to the axle assembly. The friction brake is configured to provide friction brake torque to the wheel. The control system includes a controller. The controller controls operation of the electric motor and the friction brake such that propulsion torque and friction brake torque are simultaneously provided to the wheel when braking and acceleration of the wheel are both requested for a predetermined period of time.

The control system may include an accelerator pedal. The accelerator pedal may provide a signal to the controller that is indicative of a request for acceleration.

The control system may include a brake pedal. The brake pedal may provide a signal to the controller that is indicative of a request for braking.

The controller may have an input for receiving a signal indicative of a speed of the vehicle. The controller may be configured to provide propulsion torque and friction brake torque simultaneously to the wheel when the speed of the vehicle is not greater than zero.

The controller may be configured to temporarily permit propulsion torque provided by the electric motor to exceed the friction brake torque that is provided by the friction brake when braking and acceleration of the wheel or both requested for the predetermined period of time. The predetermined period of time may be within a range of approximately 0.5 to 4 seconds. The controller may not permit the propulsion torque to exceed the friction brake torque when the speed of the vehicle is greater than zero.

The axle assembly may include a differential assembly that is operatively connected to the electric motor. The axle assembly may include an axle shaft that operatively connects the differential assembly to the wheel.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It will also be understood that, although the terms first, second, etc. are, in some instances, used herein to describe various elements, these elements should not be limited by these terms. These terms are only used to distinguish one element from another. For example, a first element could be termed a second element, and similarly a second element could be termed a first element without departing from the scope of the various described embodiments. The first element and the second element are both elements, but they are not the same element.

The terminology used in the description of the various described embodiments is for the purpose of describing particular embodiments only and is not intended to be limiting. As used in the description of the various described embodiments and the appended claims, the singular forms "a" and "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including." "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
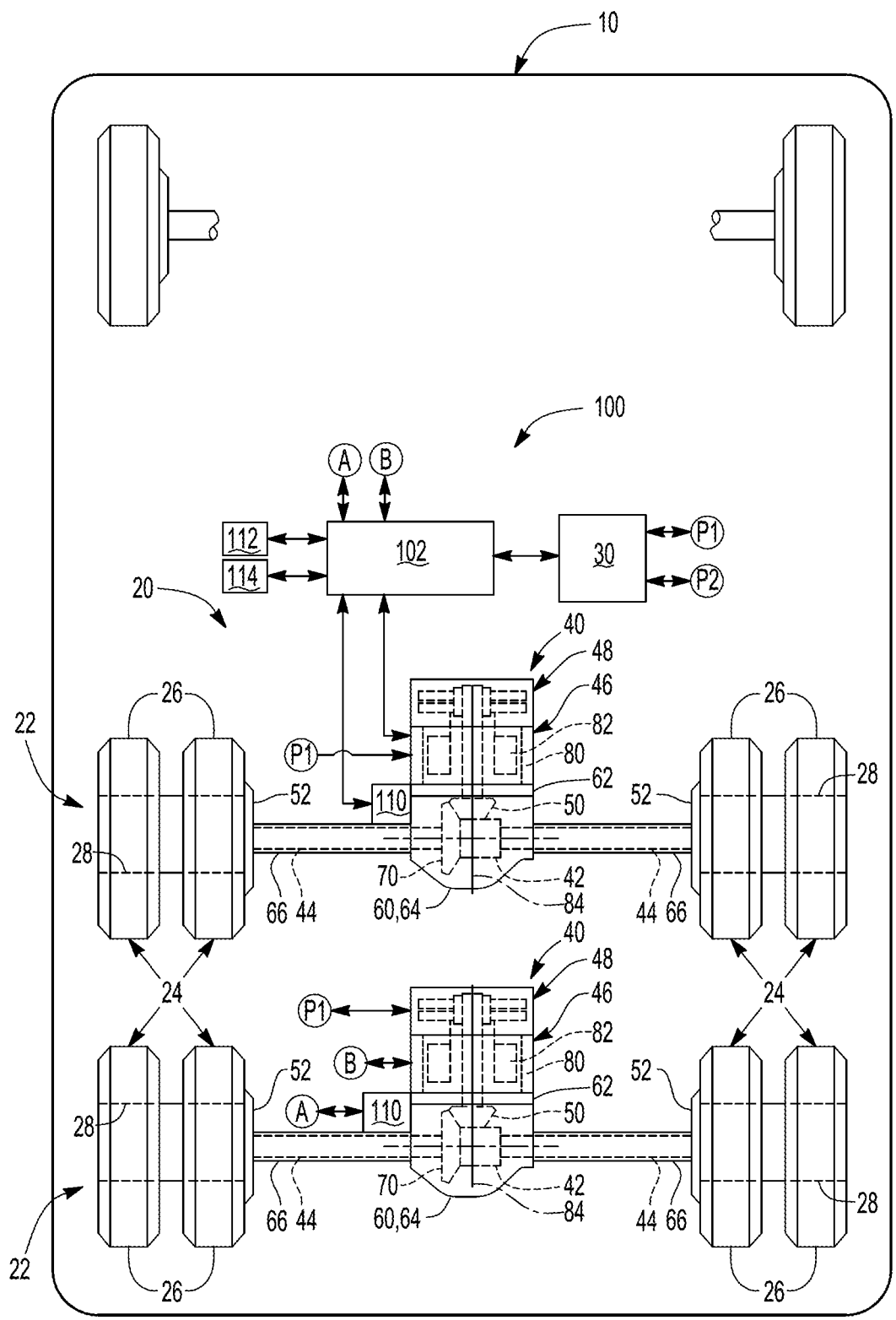
FIG. 1 is a schematic representation of an example of a vehicle having an axle assembly that includes an electric motor.

Referring to FIG. 1, an example of a vehicle 10 is shown. The vehicle 10 may be a motor vehicle like a truck, farm equipment, military transport or weaponry vehicle, or cargo loading equipment for land, air, or marine vessels. The vehicle 10 may include a trailer for transporting cargo in one or more embodiments. The vehicle 10 may include a drive axle system 20.

The drive axle system 20 includes one or more axle assemblies 22, such as a front axle assembly and a rear axle assembly. The axle assemblies 22 are illustrated as drive axle assemblies. A drive axle assembly may be configured to provide torque to one or more wheel assemblies 24 that may be rotatably supported on the axle assembly 22. A wheel assembly 24 may include a tire 26 disposed on a wheel 28. The drive axle system 20 may also include or be associated with at least one power source 30, such as an electrical power source like a battery.

In at least one configuration, the front axle assembly 22 and the rear axle assembly 22 may generally be disposed near each other and may be positioned toward the rear of the vehicle 10, similar to a conventional tandem axle arrangement. However, unlike a conventional tandem axle arrangement, the front axle assembly 22 and the rear axle assembly 22 are not operatively connected to each other and do not receive torque from the same electric motor. As such, the front axle assembly 22 and the rear axle assembly 22 are not connected in series with each other with a shaft, such as a prop shaft that may connect an output of the front axle assembly 22 with an input of the rear axle assembly 22. It is also contemplated that the front axle assembly 22 and the rear axle assembly 22 may be arranged in a different manner, such as with either or both axle assemblies being disposed near the front of the vehicle.

The front axle assembly and the rear axle assembly may have similar or identical configurations. As an example, both axle assemblies include a housing assembly 40, a differential assembly 42, a pair of axle shafts 44, an electric motor 46, a transmission 48, a drive pinion 50, or combinations thereof. In addition, a friction brake 52 may be associated with each wheel assembly 24. The positioning of the differential assembly 42, the electric motor 46, and/or the transmission 48 may differ from that shown. For instance, the differential assembly 42 may be positioned between the electric motor 46 and the transmission 48.

The housing assembly 40 receives various components of the axle assembly 22. In addition, the housing assembly 40 may facilitate mounting of the axle assembly 22 to the vehicle 10. In at least one configuration, the housing assembly 40 may include an axle housing 60 and a differential carrier 62.

The axle housing 60 may receive and support the axle shafts 44. In at least one configuration, the axle housing 60 may include a center portion 64 and at least one arm portion 66.

The center portion 64 may be disposed proximate the center of the axle housing 60. The center portion 64 may define a cavity that may receive the differential assembly 42.

One or more arm portions 66 may extend from the center portion 64. For example, two arm portions 66 may extend in opposite directions from the center portion 64 and away from the differential assembly 42. The arm portions 66 may each have a hollow configuration or tubular configuration that may extend around and may receive a corresponding axle shaft 44 and may help separate or isolate the axle shaft 44 from the surrounding environment. A wheel hub may be rotatably disposed on an arm portion 66 and operatively connected to an axle shaft 44. A wheel assembly 24 is mountable to the wheel hub.

The differential carrier 62 may be mounted to the center portion 64 of the axle housing 60. The differential assembly 42 may be rotatably supported on the differential carrier 62.

The differential assembly 42 is disposed in the housing assembly 40. For instance, the differential assembly 42 may be disposed in the center portion 64 of the axle housing 60. The differential assembly 42 may transmit torque to the axle shafts 44 of the axle assembly 22 and permit the axle shafts 44 and wheel assemblies 24 to rotate at different velocities in a manner known by those skilled in the art. For example, the differential assembly 42 may have a ring gear 70 that may be fixedly mounted on a differential case. The ring gear 70 and the differential case may be rotatable about a differential axis. The differential case may receive differential gears that may be operatively connected to the axle shafts 44.

The axle shafts 44 are configured to transmit torque between the differential assembly 42 and a corresponding wheel hub. For example, two axle shafts 44 may be provided such that each axle shaft 44 extends through a different arm portion 66 of axle housing 60. The axle shafts 44 may be rotatable about an axis, such as a wheel axis or the differential axis.

The electric motor 46 is configured to provide torque, such as propulsion torque or regenerative braking torque. Propulsion torque may be used to propel the vehicle 10, such as in a forward or backward direction. Propulsion torque may also be used to hold the vehicle in a stationary position or to help reduce, limit, or prevent vehicle rollback, such as when the vehicle 10 is on an inclined surface. Regenerative braking may provide a regenerative braking torque, which may also be referred to as regenerative brake torque. Regenerative braking may capture kinetic energy when the electric motor 46 is used to brake or slow the velocity of the vehicle 10. Recovered energy may be transmitted from the wheel assemblies 24 to drive the electric motor 46. Thus, the electric motor 46 may function as a generator and may be used to charge the power source 30. The electric motor 46 may be electrically connected to the power source 30 via an inverter in a manner known by those skilled in the art. Electrical connections between the front axle assembly 22 and the rear axle assembly 22 and the power source 30 are represented with connection symbols P1 and P2, respectively.

The electric motor 46 may be mounted to or positioned inside of the housing assembly 40. The electric motor 46 includes a stator 80 and a rotor 82. The stator 80 may be fixedly positioned with respect to the housing assembly 40. The stator 80 may encircle the rotor 82. The rotor 82 is rotatable about an axis 84 with respect to the stator 80.

The transmission 48 facilitates the transmission of torque between the electric motor 46 and the drive pinion 50. Torque transmission may be bidirectional. The transmission 48 may provide gear reduction and multiple gear ratios between the rotor 82 and the drive pinion 50. The transmission 48 may be of any suitable type. For instance, the transmission 48 may be a countershaft transmission, an epicyclic transmission (e.g., a transmission having a planetary gear set), or the like. A countershaft transmission may include a single countershaft or multiple countershafts. Examples of an axle assembly having a single countershaft transmission are disclosed in U.S. Pat. Nos. 11,002,352 and 11,209,072. Examples of an axle assembly having a dual countershaft transmission is disclosed in U.S. Pat. Nos. 10,989,288, 11,207,976, and 11,220,176. Examples of an axle assembly having an epicyclic transmission are disclosed in U.S. Pat. No. 11,038,396 and U.S. patent application Ser. No. 17/308,307. The disclosures of the references in the preceding three sentences are hereby incorporated in their entirety by reference herein.

Referring to FIG. 1, the drive pinion 50 operatively connects the differential assembly 42 and the transmission 48. The drive pinion 50 may be received in the housing assembly 40 and may transmit torque between the differential assembly 42 and the transmission 48. The drive pinion 50 may be rotatable about an axis, such as the axis 84, and may have a gear portion that has teeth that meshes with teeth of the ring gear 70 of the differential assembly 42. Torque that is provided by the electric motor 46 to the transmission 48 and to the drive pinion 50 may be transmitted to the ring gear 70 and thus to the differential assembly 42.

The friction brake 52 is configured to provide a friction brake torque that inhibits rotation or that resists or slows rotation of a wheel assembly 24. A friction brake 52 may be mounted to each arm portion 66 proximate a wheel hub that facilitates mounting of a wheel assembly 24. The friction brake 52 may be of any suitable type, such as a disc brake or a drum brake. In addition, the friction brake 52 may be actuated in any suitable manner, such as being hydraulically actuated, electrically actuated, pneumatically actuated, or the like.

A control system 100 controls operation of the drive axle system 20. For example, the control system 100 may include one or more microprocessor-based control modules or controllers 102 that may be electrically connected to or communicate with components of the vehicle 10 and/or the axle assembly 22, such as the electric motor 46, friction brakes 56, etc. Control system connections are represented by the double arrowed lines in FIG. 1 as well as by connection symbols A and B. The control system 100 may also monitor and control the power source 30. In addition, the control system 100 may also process input signals or data from various input devices or sensors. These input devices may include a speed sensor 110, an accelerator pedal 112, and a brake pedal 114.

The speed sensor 110 provides a signal indicative of the speed of the vehicle. For instance, the speed sensor 110 may provide a signal indicative of the rotational speed or rotational velocity of a rotatable component disposed downstream from the transmission 48, such as the rotational speed of a wheel assembly 24, the axle shaft 44, the drive pinion 50, or the like. In at least one configuration, the speed sensor 110 may be mounted to the axle assembly 22 and may detect rotation of a wheel hub and thus may be indicative of wheel speed.

The accelerator pedal 112 provides a signal to the controller 102 that is indicative of a request for acceleration the vehicle 10. The signal provided by the accelerator pedal 112 may be used by the controller 102 to control the electric motor 46. For instance, the controller 102 may control the electric motor 46 to provide propulsion torque based on the signal from the accelerator pedal 112. The accelerator pedal 112 may be operated by a driver or operator of the vehicle 10 to request acceleration and deceleration of the vehicle 10. The accelerator pedal 112 may have any suitable configuration. For instance, the accelerator pedal 112 may be a foot-operated pedal that may be mounted near the floor of the passenger compartment of the vehicle 10 or may be a hand-operated pedal that may be provided in another location, such as proximate a steering wheel or control console of the vehicle 10. The accelerator pedal 112 may be moveable between a first position and a second position. The first position may be a released position in which the accelerator pedal 112 is not actuated or depressed by the driver. The first position may correspond with a 0% pedal position when expressed as a percentage. The second position may be a fully actuated or "full throttle" position in which the accelerator pedal 112 is actuated or depressed by the driver to its fullest extent. The second position may correspond with a 100% pedal position when expressed as a percentage. The pedal may also be actuated to multiple intermediate positions between the first position and the second position. These intermediate positions may correspond to pedal positions that are greater than 0% and less than 100% when expressed as a percentage.

The brake pedal 114 provides a signal to the controller 102 that is indicative of a request for deceleration the vehicle 10. The signal provided by the brake pedal 114 may be used by the controller 102 to control the friction brake 52. For instance, the controller 102 may control a brake actuator that actuates the friction brake 52 to provide a friction brake torque based on the signal from the brake pedal 114. The brake pedal 114 may be operated by a driver of the vehicle 10 to request deceleration of the vehicle 10. The brake pedal 114 may have any suitable configuration. For instance, the brake pedal 114 may be a foot-operated pedal that may be mounted near the floor of the passenger compartment of the vehicle 10 or may be a hand-operated pedal that may be provided in another location, such as proximate a steering wheel or control console of the vehicle 10. The brake pedal 114 may be moveable between a first position and a second position. The first position may be a released position in which the brake pedal 114 is not actuated or depressed by the driver. The first position may correspond with a 0% pedal position when expressed as a percentage. The second position may be a fully actuated position in which the brake pedal 114 is actuated or depressed by the driver to its fullest extent. The second position may correspond with a 100% pedal position when expressed as a percentage. The pedal may also be actuated to multiple intermediate positions between the first position and the second position. These intermediate positions may correspond to pedal positions that are greater than 0% and less than 100% when expressed as a percentage.

Figure 2:
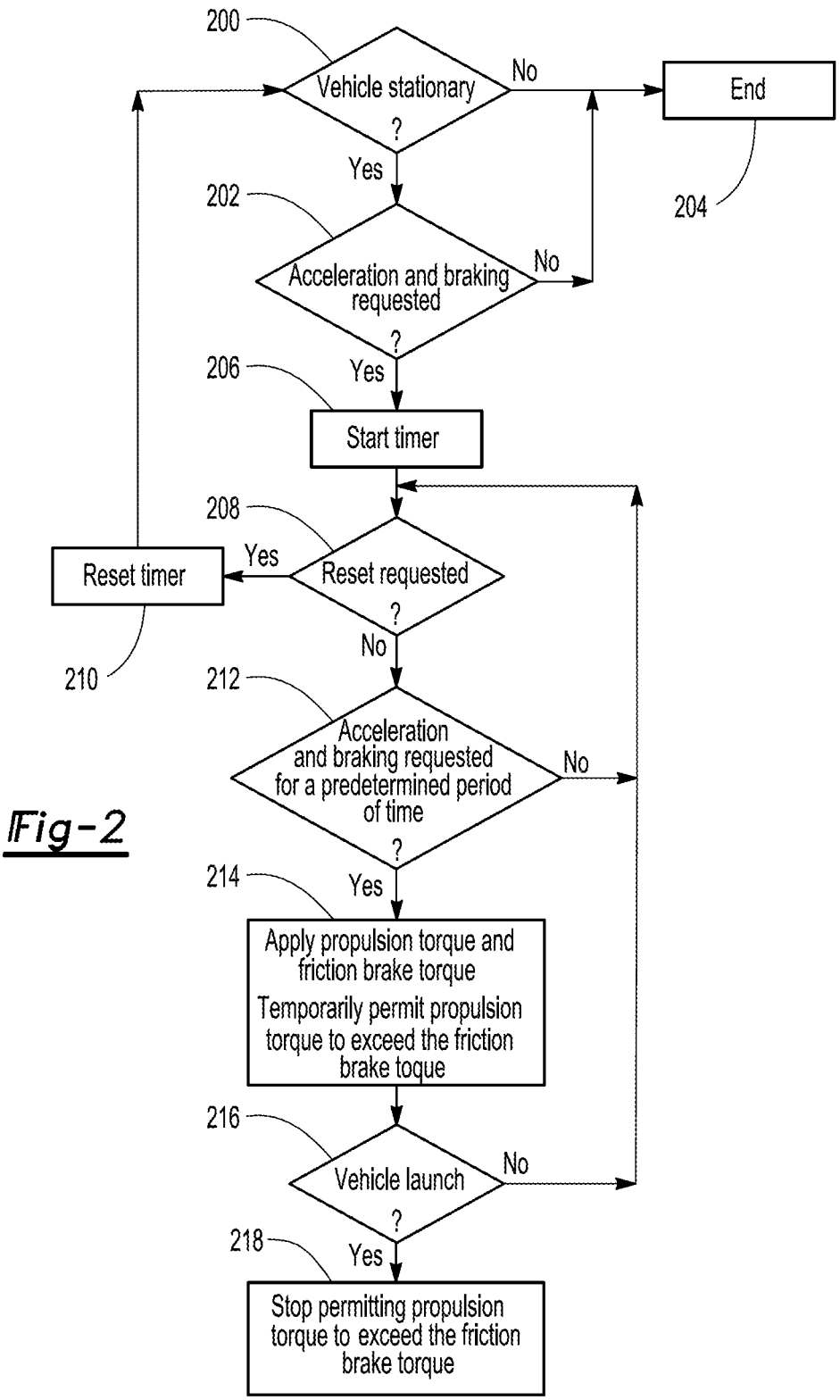
FIG. 2 is a flowchart of a method of control.

Referring to FIG. 2, a flowchart of a method of controlling a vehicle and an axle assembly is shown. As will be appreciated by one of ordinary skill in the art, the flowcharts may represent control logic which may be implemented or affected in hardware, software, or a combination of hardware and software. For example, the various functions may be affected by a programmed microprocessor. The control logic may be implemented using any of a number of known programming and processing techniques or strategies and is not limited to the order or sequence illustrated. For instance, interrupt or event-driven processing may be employed in real-time control applications rather than a purely sequential strategy as illustrated. Likewise, parallel processing, multi-tasking, or multi-threaded systems and methods may be used.

Control logic may be independent of the particular programming language, operating system, processor, or circuitry used to develop and/or implement the control logic illustrated. Likewise, depending upon the particular programming language and processing strategy, various functions may be performed in the sequence illustrated, at substantially the same time, or in a different sequence while accomplishing the method of control. The illustrated functions may be modified, or in some cases omitted, without departing from the scope of the present invention. Method steps may be executed by the control system 100 and may be implemented as a closed loop control system.

As an overview, an electric vehicle or vehicle that has an axle assembly that is powered by an electric motor rather than an internal combustion engine is susceptible to rolling on inclined surfaces. For instance, such a vehicle is susceptible to rolling when the vehicle is stationary and brake torque is released or no longer applied. Applying brake torque with the electric motor to resist rolling is possible but only for a limited period of time as the electric motor can overheat when such brake torque is applied. Alternatively, brake torque can be applied with a friction brake or antilock braking system that is associated with a friction brake. However, rollback can still occur when the friction brake is released (i.e., brake torque is not applied) and propulsion torque is not provided with the electric motor or the propulsion torque provided by the electric motor is not yet sufficient to prevent rolling. To address these problems, the present invention preloads the vehicle drivetrain to reduce or prevent vehicle rollback by applying propulsion torque and brake torque simultaneously for a limited period of time. Applying propulsion torque and brake torque simultaneously can reduce or prevent rollback in many situations. However, there may be situations in which the vehicle is more susceptible to rollback (e.g., when the road upon which the vehicle is situated has a greater slope, the vehicle has greater weight, etc.) and in which rollback may not be sufficiently addressed by applying propulsion torque and brake torque simultaneously and in equal amounts. Consequently, the present invention temporarily overrides default torque security measures that would otherwise prevent the propulsion torque from defeating or overcoming the friction brake torque.

The method steps shown in FIG. 2 are used to control the propulsion torque that is provided by the electric motor of an axle assembly and the friction brake torque that is provided by the friction brakes of the axle assembly. For illustration purposes, the method is best understood in the context of a vehicle initially being parked or stationary on an uphill grade. As such, the direction of travel of the vehicle when sufficient propulsion torque is provided will be in an uphill direction. In such a scenario, the vehicle will tend to roll backwards or downhill in the absence of a sufficient counteracting force.

Additionally, the method in FIG. 2 is described under the following initial operational conditions. First, the vehicle is stationary (e.g., vehicle speed=0 km/h). Second, brake torque is initially provided by a friction brake and not by the electric motor (i.e., not by regenerative braking or by using electric energy to inhibit rotation of the rotor of the electric motor). Third, torque security measures are in effect that prevent propulsion torque provided by the electric motor from defeating or overcoming the friction brake torque. For instance, the torque security measures may limit the propulsion torque that can be provided by the electric motor by a predetermined amount that is insufficient to overcome the friction brake torque that may be exerted by the friction brakes in the event that propulsion torque and friction brake torque are simultaneously provided. As a nonlimiting example, the propulsion torque that can be provided by the electric motor may be limited to around 60% of the capability of the motor when torque security measures are in effect.

At block 200, the method determines whether the vehicle is stationary. The vehicle may be stationary when the vehicle speed is not greater than zero, such as when the vehicle is parked or not rolling. Determining whether the vehicle is stationary may be based on the signal from the speed sensor 110. If the vehicle is stationary, then the method continues at block 202. If the vehicle is not stationary, then the method or method iteration ends at block 204.

At block 202, the method determines whether acceleration and braking of the vehicle are requested. Determining whether acceleration is requested may be based on a signal from the accelerator pedal 112 or a sensor associated with the accelerator pedal 112. For instance, the accelerator pedal 112 may be actuated from the first position or 0% pedal position to or toward the second position as previously discussed. Determining whether braking is requested may be based on the signal from the brake pedal 114 or a sensor associated with the brake pedal 114. For instance, the brake pedal 114 may be actuated from the first position or 0% pedal position to or toward the second position as previously discussed. As a result, both the accelerator pedal 112 and the brake pedal 114 are both actuated or depressed concurrently when acceleration and braking of the vehicle is requested. If acceleration and braking of the vehicle is not requested (e.g., the accelerator pedal 112 and/or the brake pedal 114 is released or not actuated), then the method or method iteration ends at block 204. If acceleration and braking of the vehicle are requested, then the method may continue at block 206.

At block 206, a timer is started. Starting the timer may include initializing or resetting the timer to zero and then running the timer to provide a signal or data indicative of elapsed time. The timer may be started when the accelerator pedal 112 and the brake pedal 114 are both actuated or depressed. Moreover, the timer may continue to run while the accelerator pedal 112 and the brake pedal 114 remain actuated or depressed.

At block 208, the method determines whether resetting of the timer is requested. Resetting of the timer may be requested when the accelerator pedal 112 is released or no longer actuated, when the brake pedal 114 is released or no longer actuated, or both. The timer may stop running when a reset is requested. If a reset of the timer is requested, then the method may continue at block 210. If a reset of the timer is not requested, then the timer continues to run and the method continues at block 212.

At block 210, the timer is reset. The timer may be reset or initialized by clearing the elapsed time from the most recent timer cycle from memory or setting the measurement of elapsed time to zero. The method may then repeat or restart at block 200.

At block 212, the method determines whether acceleration and braking have been requested for a predetermined period of time. The amount of time that acceleration and braking have been requested may be based on the timer. The predetermined period of time may be based on vehicle development testing. For instance, the predetermined period of time may be within the range of approximately 0.5 to 5 seconds, such as from approximately 2 to 4 seconds. The predetermined period of time may be a period of time that is sufficient to indicate that the operator is intentionally requesting acceleration and braking rather than inadvertent or unintentional actuation of both the accelerator pedal and the brake pedal. The likelihood of inadvertent or unintentional actuation may decrease as the predetermined period of time increases. If acceleration and braking have not been requested for the predetermined period of time, then the timer may continue to run and method may return to block 208. If acceleration and braking have been requested for the predetermined period of time or longer, then the method may continue at block 214.

At block 214, propulsion torque and friction brake torque are both applied or provided. Propulsion torque is applied by providing power from the power source 30 to the electric motor 46 to attempt to propel the vehicle forward. Friction brake torque may be applied continuing to actuate the friction brake 52. Thus, it is contemplated that friction brake torque may be provided to hold the vehicle in position in the previous blocks and propulsion torque is provided in addition to the friction brake torque at block 214.

In addition to providing propulsion torque and friction brake torque, the method temporarily permits the propulsion torque to exceed the friction brake torque. Thus, the friction brake torque may attempt to hold the vehicle in the stationary position to prevent rollback while the propulsion torque may work against the friction brake torque and attempt to overcome the friction brake torque to propel the vehicle forward. The amount of propulsion torque that is provided may be based on the signal from the accelerator pedal 112. The amount of friction brake torque that is provided may be based on the signal from the brake pedal 114. It is contemplated that the amount of propulsion torque that is provided may be automatically increased to exceed the friction brake torque by a predetermined amount (e.g., by 1% to 20%) to increase the likelihood that the propulsion torque overcomes the friction brake torque and the vehicle begins to roll forward. It is also contemplated that the amount of friction brake torque that is provided may be automatically adjusted to a predetermined value that is deemed sufficient to prevent vehicle rollback. The predetermined value may be based on data from a lookup table and may be based on attributes of the vehicle, such as vehicle weight, the gradient or slope of the road upon which the vehicle is located, or combinations thereof.

At block 216, the method determines whether the vehicle has launched. The vehicle has launched when the vehicle speed is greater than zero (e.g., the vehicle is moving forward). The vehicle has not launched when the vehicle speed is not greater than zero (e.g., the vehicle speed is zero or the vehicle speed is a negative value or indicates that the vehicle is rolling backwards). The vehicle speed may be based on the signal from the speed sensor 110 as previously discussed. If the vehicle has not launched, then the method may return to block 208. Propulsion torque and friction brake torque may continue to be applied while the accelerator pedal 112 and brake pedal 114 remain depressed. It is also contemplated that the propulsion and friction brake torque may continue to be applied while the accelerator pedal 112 and the brake pedal 114 remain depressed but only for a second predetermined period of time. As a nonlimiting example, the second predetermined period of time may be around 10 seconds. If the vehicle has launched, then the method may continue at block 218.

At block 218, the method may stop permitting the propulsion torque to temporarily exceed the friction brake torque. As a result, default torque security measures may go back into effect. Resuming default torque security measures may encourage the vehicle operator to resume normal driving practices in which only one pedal is actuated at a time. In addition, the default security measures may favor braking or slowing of the vehicle as compared to propelling or accelerating the vehicle when propulsion torque and braking torque are simultaneously requested.

A system and method as described above may help reduce or prevent vehicle rollback. Moreover, the system and method may preload the drivetrain to not only reduce or prevent rollback but also increase the likelihood that the vehicle will launch or roll forward. The system and method may avoid overheating that can occur if braking or brake torque is provided with an electric motor. Moreover, the system and method allow propulsion torque to exceed friction brake torque only on a limited basis to help improve drivability of the vehicle. The system and method does not need to utilize information that is indicative of the slope of the road upon which the vehicle is situated. In addition, the system and method can be implemented without an electric parking brake or by providing friction brake torque with an anti-lock brake system. Thus, a vehicle may be configured to provide rollback prevention in a less expensive manner.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of controlling a vehicle, the method comprising:
    simultaneously requesting braking and acceleration of the vehicle for a predetermined period of time; and
    simultaneously providing propulsion torque to a wheel disposed on an axle assembly with an electric motor and providing friction brake torque to the wheel with a friction brake starting when the predetermined period of time has elapsed.

2. The method of claim 1 further comprising determining whether the vehicle is stationary before simultaneously providing propulsion torque and friction brake torque to the wheel and simultaneously providing propulsion torque and friction brake torque to the wheel when the vehicle is stationary.

3. The method of claim 2 wherein simultaneously providing propulsion torque and friction brake torque to the wheel further comprises temporarily permitting propulsion torque to exceed the friction brake torque.

4. The method of claim 3 wherein the simultaneously providing propulsion torque and friction brake torque includes providing propulsion torque that exceeds the friction brake torque.

5. The method of claim 4 further comprising determining whether the vehicle launches after temporarily permitting propulsion torque to exceed the friction brake torque.

6. The method of claim 5 wherein the vehicle launches when a vehicle speed is greater than zero.

7. The method of claim 5 further comprising stopping temporarily permitting propulsion torque to exceed the friction brake torque once the vehicle launches.

8. The method of claim 5 further comprising measuring the predetermined period of time with a timer, and resetting the timer when the vehicle does not launch.

9. The method of claim 1 further comprising measuring the predetermined period of time with a timer, wherein the timer starts when braking and acceleration of the vehicle are both requested.

10. The method of claim 9 further comprising resetting the timer when braking is not requested, or acceleration is not requested, or braking and acceleration are not requested.

11. The method of claim 9 wherein braking of the vehicle is based on a signal from a brake pedal and acceleration of the vehicle is based on a signal from an accelerator pedal.

12. A vehicle comprising:
an axle assembly that includes an electric motor that is configured to provide propulsion torque to a wheel that is mounted to the axle assembly and a friction brake configured to provide friction brake torque to the wheel; and
a control system that includes a controller that controls operation of the electric motor and the friction brake such that propulsion torque and friction brake torque are simultaneously provided to the wheel starting when braking and acceleration of the wheel are simultaneously requested for a predetermined period of time and the predetermined period of time has elapsed.

13. The vehicle of claim 12 wherein the control system further comprises an accelerator pedal that provides a signal to the controller that is indicative of a request for acceleration.

14. The vehicle of claim 12 wherein the control system further comprises a brake pedal that provides a signal to the controller that is indicative of a request for braking.

15. The vehicle of claim 12 wherein the controller has an input for receiving a signal indicative of a speed of the vehicle and wherein the controller is configured to provide propulsion torque and friction brake torque simultaneously to the wheel when the speed of the vehicle is not greater than zero.

16. The vehicle of claim 12 wherein the controller is configured to temporarily permit propulsion torque provided by the electric motor to exceed the friction brake torque provided by the friction brake when braking and acceleration of the wheel are both requested for the predetermined period of time.

17. The vehicle of claim 16 wherein the predetermined period of time is within a range of approximately 0.5 to 4 seconds.

18. The vehicle of claim 16 wherein the controller does not permit the propulsion torque to exceed the friction brake torque when a speed of the vehicle is greater than zero.

19. The vehicle of claim 16 wherein the axle assembly further comprises a differential assembly that is operatively connected to the electric motor and an axle shaft that operatively connects the differential assembly to the wheel.

20. The method of claim 1 wherein friction brake torque is provided to the wheel with the friction brake before simultaneously providing propulsion torque to the wheel with the electric motor and providing friction brake torque to the wheel with the friction brake.

* * * * *